United States Patent
Wright, III

(10) Patent No.: US 11,351,907 B2
(45) Date of Patent: Jun. 7, 2022

(54) BOAT TRAILER WATER LEVEL DETECTION SYSTEM

(71) Applicant: TOYOTA MOTOR ENGINEERING & MANUFACTURING NORTH AMERICA, INC., Plano, TX (US)

(72) Inventor: Thomas Andrew Wright, III, Howell, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 40 days.

(21) Appl. No.: 16/751,621

(22) Filed: Jan. 24, 2020

(65) Prior Publication Data

US 2021/0229589 A1   Jul. 29, 2021

(51) Int. Cl.
  *G01F 23/00* (2022.01)
  *B60P 3/10* (2006.01)

(52) U.S. Cl.
  CPC ............ *B60P 3/1075* (2013.01); *G01F 23/00* (2013.01)

(58) Field of Classification Search
  CPC .... G05D 1/0206; G05D 1/0208; G05D 1/048; G05D 1/0875
  See application file for complete search history.

(56) References Cited

U.S. PATENT DOCUMENTS

| | | |
|---|---|---|
| 3,821,699 A | 6/1974 | Marus et al. |
| 5,097,250 A | 3/1992 | Hernandez |
| 5,396,857 A | 3/1995 | Emery, Jr. |
| 5,850,175 A | 12/1998 | Yeilding |
| 9,707,964 B2 | 7/2017 | Di Miro et al. |
| 9,821,808 B1 | 11/2017 | Abbas et al. |
| 9,884,555 B2 | 2/2018 | Tran et al. |
| 10,300,928 B2 | 5/2019 | Trageser |
| 2011/0018724 A1* | 1/2011 | Little ............... B60D 1/145 340/618 |
| 2017/0341583 A1* | 11/2017 | Zhang .................. B60R 1/00 |
| 2018/0215394 A1* | 8/2018 | Trageser ............ B60P 3/1033 |
| 2019/0129426 A1* | 5/2019 | Garcia ............. G05D 1/0278 |
| 2020/0094738 A1* | 3/2020 | Lane .................. B60T 17/22 |

FOREIGN PATENT DOCUMENTS

KR       20180062190 A  *  6/2018

* cited by examiner

*Primary Examiner* — Herbert K Roberts
(74) *Attorney, Agent, or Firm* — Haynes and Boone, LLP

(57) ABSTRACT

Disclosed is a system for monitoring the water level proximate to a vehicle. The system comprises a control unit and at least one sensor in communication with the control unit. The at least one sensor is configured such that the control unit can determine a pitch of a trailer coupled to the vehicle and the height of a surface of water proximate to the trailer. The system includes a display screen displaying a representation of the trailer including the pitch of the trailer, and a representation of the surface of water proximate to the trailer.

20 Claims, 6 Drawing Sheets

BOAT TRAILER WATER LEVEL DETECTION SYSTEM

TECHNICAL FIELD

The subject matter described herein relates to devices, systems, and methods for detecting the depth of water around or behind a vehicle. This technology has particular but not exclusive utility for launching and retrieving watercraft from trailers towed by cars and trucks.

BACKGROUND

Boats and other watercraft can be transported by vehicles using boat trailers and launched into a body of water by backing the trailer down a boat ramp until the boat floats off the trailer. Due to the presence of the boat and trailer, the vehicle's driver typically has limited visibility through the rearview and side view mirrors, which means that backing the trailer straight down the ramp can be challenging. This is complicated by the fact that the water level on the boat ramp—and hence the degree of submergence of the boat trailer—may be difficult for the driver to discern. If the degree of submergence is too shallow, the boat will not float off the trailer properly, whereas if it is too deep, the vehicle tailpipe or other vehicle components can be submerged, potentially causing damage to the vehicle. Thus, while backing down the boat ramp it is common for the driver to exit the vehicle repeatedly to check the water level, or to require the assistance of a second person outside the vehicle to act as a spotter.

The information included in this Background section of the specification, including any references cited herein and any description or discussion thereof, is included for technical reference purposes only and is not to be regarded as limiting.

SUMMARY

The present disclosure provides a sensing system to inform a driver about the degree of submergence of a boat trailer and/or a vehicle while delivering a boat into water. The boat trailer water level detection system provides an improvement over the current technology by determining a level of submergence of a boat ramp and/or a vehicle using sensors positioned on the boat trailer and/or the vehicle.

The boat trailer water level detection system disclosed herein has particular, but not exclusive, utility for launching and retrieving watercraft from trailers towed by cars and trucks. One general aspect of the boat trailer water level detection system includes a system for monitoring a water level proximate to a vehicle. The system also includes a control unit; at least one sensor in communication with the control unit, where the at least one sensor is configured such that the control unit can determine: a pitch of a trailer coupled to the vehicle; and a height of a surface of water proximate to the trailer. The system also includes a display screen controlled by the control unit to display an image including: a representation of the trailer including the pitch of the trailer, and a representation of the surface of water proximate to the trailer. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following features. The system where the at least one sensor includes at least one of a camera, radar, lidar, sonar, RF shadow, proximity, infrared, moisture, immersion, depth, weight, acceleration, or inclination sensor. The system where the at least one sensor is further configured such that the control unit can determine a pitch of the vehicle and a position of the vehicle relative to the trailer and the surface of water, and where the display screen further displays a representation of the vehicle including the pitch of the vehicle. The system where the at least one sensor is further configured such that the control unit can determine, for a watercraft on or proximate to the trailer, a location and pitch relative to the trailer and the surface of water, and where the display screen further displays a representation of the watercraft, including the location or pitch of the watercraft relative to the trailer and the surface of water. The system where the control unit is further configured to display an indication that the watercraft is floating if the location or pitch relative to the trailer is outside a threshold range. The system where the at least one sensor includes a weight sensor configured to measure a weight of a watercraft on the trailer, and where the control unit is further configured to display an indication that the watercraft is floating if the measured weight is less than a threshold amount. The system where the display screen is a portable device or vehicle head unit. The system further including the vehicle. The system further including the trailer. The system further including a watercraft positionable on the trailer. Implementations of the described techniques may include hardware, a method or process, or computer software on a computer-accessible medium.

One general aspect includes, in a control unit, receiving sensor data from at least one sensor; based on the sensor data, determining a pitch of a trailer coupled to a vehicle; and a height of a surface of water proximate to the trailer. The method also includes displaying, on a display screen controlled by the control unit, an image including: a representation of the trailer including the pitch of the trailer, and a representation of the surface of water proximate to the trailer. Other embodiments of this aspect include corresponding computer systems, apparatus, and computer programs recorded on one or more computer storage devices, each configured to perform the actions of the methods.

Implementations may include one or more of the following features. The method where the at least one sensor includes at least one of a camera, radar, lidar, sonar, RF shadow, proximity, infrared, moisture, immersion, depth, weight, acceleration, or inclination sensor. The method further including: determining a pitch of the vehicle the height of the vehicle relative to the surface of water; and displaying a representation of the vehicle including the pitch of the vehicle along with the representation of the trailer and the representation of the surface of water. The method further including: determining, for a watercraft on or proximate to the trailer, a location and pitch relative to the trailer and the surface of water; and displaying a representation of the watercraft, including the location or pitch of the watercraft relative to the trailer and the surface of water. The method further including displaying an indication that the watercraft is floating if the location or pitch relative to the trailer is outside a threshold range. The method where the at least one sensor includes a weight sensor configured to measure a weight of a watercraft on the trailer, and where the method further includes displaying an indication that the watercraft is floating if the measured weight is less than a threshold amount. The method where the display screen is a portable device or vehicle head unit. The method where the control unit is associated with the vehicle, the trailer, or a watercraft positionable on the trailer. Implementations of the described techniques may include hardware, a method or process, or computer software on a computer-accessible medium.

One general aspect includes a system for monitoring water level proximate to a vehicle. The system also includes a control unit; at least one sensor in communication with the control unit, where the at least one sensor is configured such that the control unit can determine a depth of water proximate to the vehicle within a body of water; and a display screen disposed within a dashboard of the vehicle and controlled by the control unit to display an image including a representation of the depth of the vehicle in the body of water. Other embodiments of this aspect include corresponding computer systems, apparatus, and computer programs recorded on one or more computer storage devices, each configured to perform the actions of the methods.

Implementations may include one or more of the following features. The system further including an audible tone controlled by the control unit, where the audible tone is indicative of the depth of the vehicle in the body of water. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the boat trailer water level detection system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
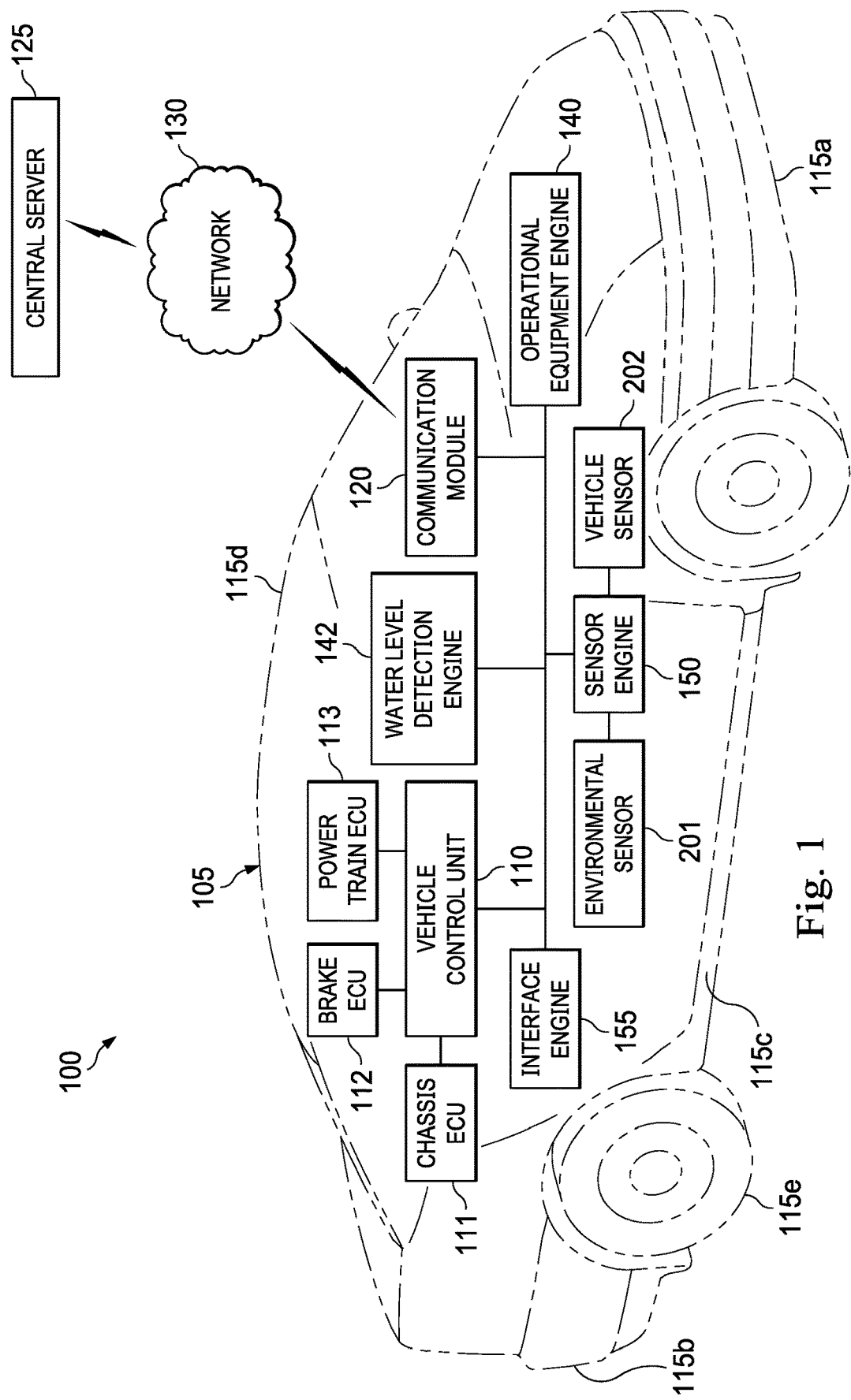
FIG. 1 is a diagrammatic illustration of a boat trailer water level detection system in accordance with at least one embodiment of the present disclosure.

In accordance with at least one embodiment of the present disclosure, a boat trailer water level detection system is provided that detects the degree of submergence of a boat trailer being towed into or out of a body of water. The boat trailer water level detection system provides an improvement over the current technology by determining and reporting a level of submergence of a boat ramp and/or a vehicle using sensors positioned on the boat trailer and/or the vehicle.

In some embodiments, a vehicle may include a trailer hitch that is configured to receive a boat trailer. The vehicle and/or the boat trailer may include sensors that detect water. For example, the sensors may include imaging sensors, sonar, or pressure sensors to detect submergence of a portion of the vehicle or the trailer. As another example, the sensors may include moisture sensors (e.g., electrical conductivity sensors) that detect the presence of water at one or more locations on the exterior of the vehicle and/or boat trailer.

The vehicle system may determine the level of submergence of the vehicle and/or the boat ramp based on data from the sensors. When the level of submergence exceeds a threshold level, the vehicle may output an alert to the driver, e.g., audio alerts, or display alerts on a head unit. In this regard, the driver may know the level of submergence while pulling a boat out of water or backing the boat into the water, without getting out of the vehicle or requiring the assistance of a spotter watching the boat trailer from outside the vehicle.

According to the present disclosure, sensors such as imaging sensors, sonar, pressure sensors, or conductivity sensors may be used to determine the level of submergence of a vehicle and/or a boat trailer. In this regard, the driver may know the level of submergence while pulling a boat out of water or backing the boat into the water without getting out of the vehicle and observing the boat trailer directly. This technology may also have applications in off-road vehicles, for example while fording streams, to inform the driver if the vehicle is submerged enough that the water level presents a threat to the engine or other vehicle components.

The present disclosure aids substantially in boat launching and retrieval from vehicle trailers, by improving the ability of the vehicle driver to ascertain the level of submergence of the boat and trailer. Implemented on a screen display in communication with sensors and a processor, the boat trailer water level detection system disclosed herein provides practical guidance to the vehicle driver during boat launching and retrieval operations. This improved situational awareness transforms a challenging multi-step or multi-person operation into one that can be safely performed by a vehicle driver, without the normally routine need to exit the vehicle or engage the services of a spotter. This unconventional approach improves the functioning of the vehicle, by reducing the amount of time and effort required to launch or retrieve a watercraft from a body of water.

The boat trailer water level detection system may be implemented through a screen interface, with annotated photographic or graphical images that are viewable on the screen display, and operated by a control process executing on a processor that accepts inputs from sensors placed on the vehicle, trailer, or watercraft, and/or from a user via a touchscreen, control panel, joystick, switches, buttons, or other user interface. In that regard, the control process performs certain specific operations in response to different inputs or received at different times, either from one or more sensors, or from a vehicle operator. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the boat trailer water level detection system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a boat trailer water level detection system in accordance with at least one embodiment of the present disclosure. In an example, a boat trailer water level detection system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the boat trailer water level detection system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a boat trailer water level detection engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
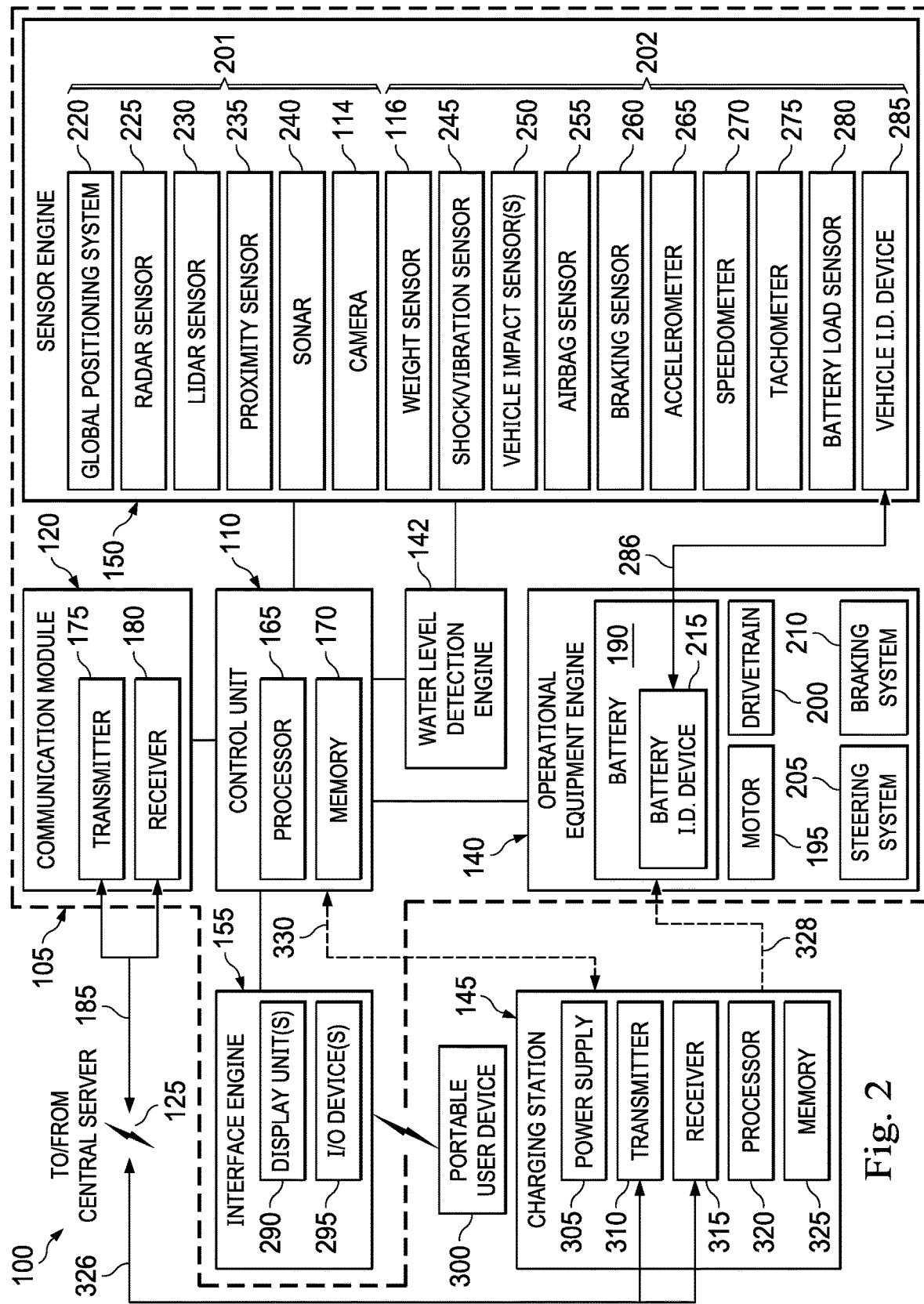
FIG. 2 is a diagrammatic illustration, in a block-diagram form, of at least a portion of the boat trailer water level detection system of FIG. 1, in accordance with at least one embodiment of the present disclosure.

FIG. 2 is a diagrammatic illustration, in a block-diagram form, of at least a portion of the boat trailer water level detection system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The boat trailer water level detection system 100 also includes a water level detection engine 142, the operation of which will be described below. In some embodiments, the water level detection engine 142 comprises a standalone housing with its own processor and memory. In other embodiments, the water level detection engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the water level detection 142 receives sensor data from one or more rear-facing sensors, which may for example be radar sensors 225, lidar sensors 230, proximity sensors 235, sonar sensors 240, cameras 114, or other sensors 201 in order to determine the degree of submersion of the vehicle, a trailer, a watercraft associated with the trailer, or combinations thereof. In some embodiments, the water level detection system engine 142 may accept information from one or more inclinometers or accelerometers 265, in order to determine the pitch or degree of tilt of the vehicle, a trailer, a watercraft located on the trailer, or combinations thereof. This may be helpful in determining a depth of immersion of different parts of the trailer, vehicle, or watercraft, as under most watercraft launch and retrieval conditions, the surface of the water itself may be assumed to be horizontal and substantially flat.

A reader of ordinary skill in the art will understand that other components or arrangements of components may be found in a vehicle 105, and that the same general principles apply to electric vehicles, internal combustion vehicles, and hybrid vehicles.

Figure 3:
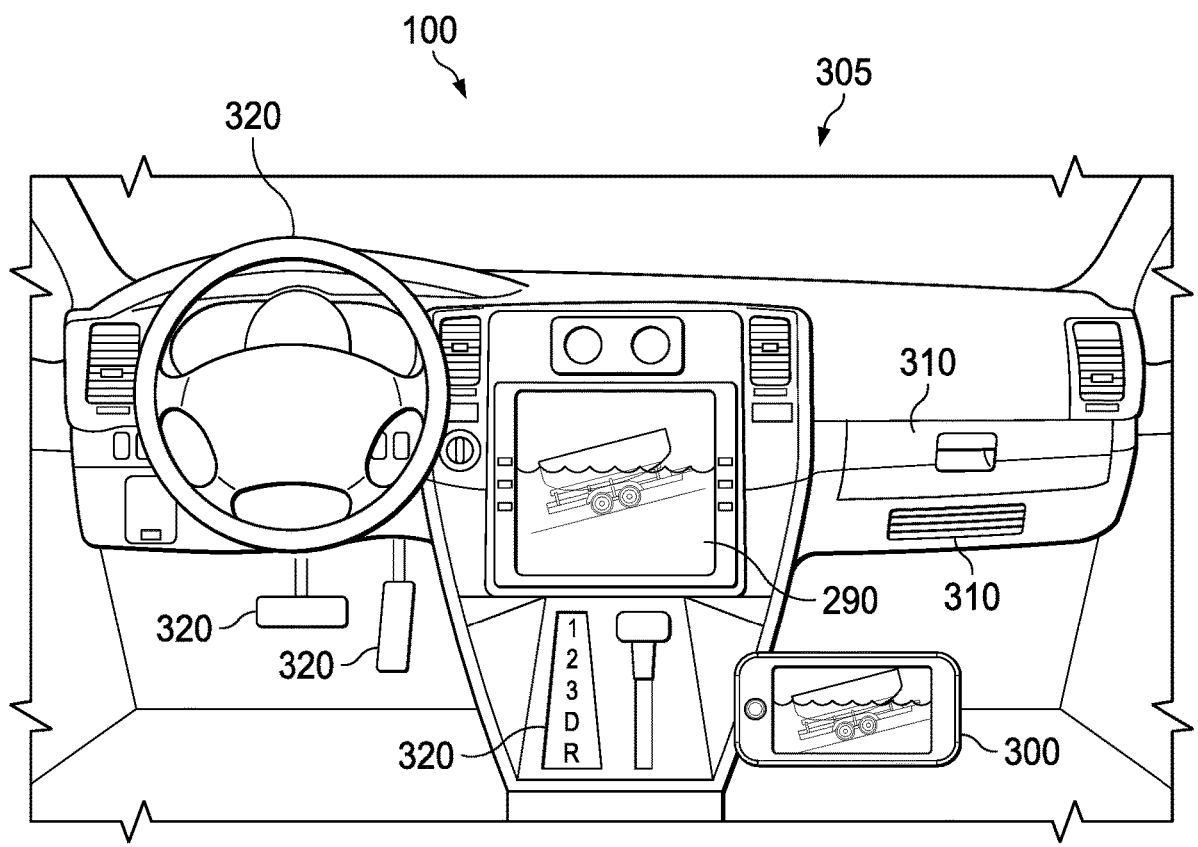
FIG. 3 is a diagrammatic illustration of an example vehicle cabin that includes a boat trailer water level detection system in accordance with at least one embodiment of the present disclosure.

FIG. 3 is a diagrammatic illustration of an example vehicle cabin 305 that includes a boat trailer water level detection system 100 in accordance with at least one embodiment of the present disclosure. Visible are vehicle interior design features 310 and driving controls 320, a head unit 290, and a mobile device 300. In an example, during normal backing operations, the head unit 290 may display the view from a backup camera. However, the presence of a trailer (possibly including a watercraft carried on the trailer) may partially or fully block the view of the backup camera. Therefore, in some embodiments of the boat trailer water detection system 100, instead of or in addition to the view from the backup camera, the head unit 290 and/or mobile device 300 display real-time data from the water level detection engine 142 (as shown for example in FIGS. 1 and 2), or processor circuit 750 (as shown for example in FIG. 7), during watercraft launching or retrieval operations. These real-time views enable the vehicle's driver to see, at a glance, the immersion depth or status of the vehicle, trailer, and/or a watercraft positioned on the trailer. The driver can then position the vehicle or trailer to an appropriate depth for watercraft launching or retrieval, without needing a spotter outside the vehicle, without needing to refer to blocked or partial views through a mirror, and without the need for the driver to exit the vehicle to assess the depth first-hand. The boat trailer water level detection system 100 may be activated by a button push or menu selection, or may be activated automatically by a control unit based on data received from one or more sensors.

In some embodiments, the displayed real-time data from the water level detection engine may comprise a visual, schematic, or diagrammatic representation of the vehicle, trailer, or watercraft. In some embodiments, the displayed real-time data from the water level detection engine may comprise a numerical value indicative of an immersion level of the vehicle, trailer, or watercraft. For example, the head unit 290 may display a percentage value where 0% indicates the vehicle is completely out of the water, and 100% indicates the vehicle is immersed to a degree that represents a substantial risk of mechanical damage. In some embodiments, an audible tone indicative of the immersion depth of the vehicle, trailer, or watercraft may be provided. In some embodiments, the water level detection engine 142 may be employed during activities other than watercraft launching and retrieval. For example, the water level detection engine 142 may be employed as a safety feature during floods or stream crossings, to warn the vehicle driver when the depth of the water is approaching levels that may endanger the mechanical integrity of the vehicle or the safety of vehicle occupants.

Figure 4:
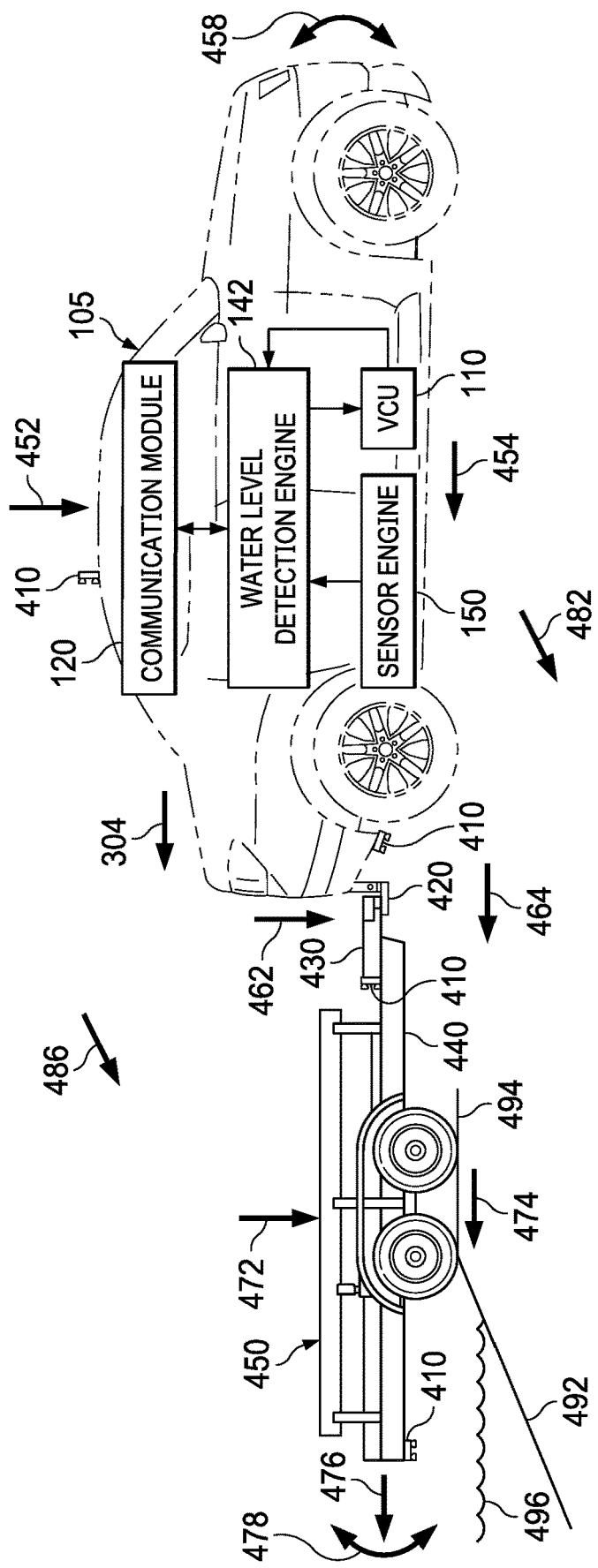
FIG. 4 is a diagrammatic illustration of an example boat trailer water level detection system of a vehicle towing a trailer in accordance with at least one embodiment of the present disclosure.

FIG. 4 is a diagrammatic illustration of an example boat trailer water level detection system 100 of a vehicle 105 towing a trailer 450 in accordance with at least one embodiment of the present disclosure. In this implementation, for clarity, only certain engines are shown. However, other engines or system, including those describe herein, are also contemplated as being a part of the vehicle shown in FIG. 4. In the example shown, within the vehicle 105 the VCU 110, sensor engine 150, and communications module 120 are in communication with a water level detection engine 142 that is capable of performing additional operations specific to sensing, estimating, computing, and displaying the water level of a body of water relative to the vehicle 105 and/or trailer 450. The vehicle 105 includes a trailer hitch 420 that connects to a removable coupler 430 which is fixedly attached to the tongue 440 of a trailer 450.

Force variables that may affect watercraft launching or retrieval operations include but are not limited to the vehicle absolute weight 452, vehicle rolling friction 454, vehicle aerodynamic drag 304, vehicle pitch 458, trailer pitch 478, trailer tongue weight 462, trailer tongue drag 464, trailer absolute weight 472, trailer rolling friction 474, and trailer aerodynamic drag 476. In some examples, each of these variables is a force that may be expressed in lbf, Newtons, or any other unit of force as desired. If force sensors exist in the trailer hitch 420, it may be possible to obtain a direct measurement of the tongue weight 462 and tongue drag 464, where tongue drag is approximately equal to the trailer rolling resistance 484. The total rolling resistance 486 of the vehicle with trailer is the vector sum of the vehicle rolling resistance 482 and trailer rolling resistance 484. In some embodiments, one or more of these force variables are measured, calculated, estimated, or looked up by a control unit (e.g., VCU 110) during towing, watercraft launching, or watercraft retrieval operations.

The water level detection engine 142 receives data from one or more sensors 410 positioned on the vehicle 105 and/or the trailer 450. This sensor data may include camera, radar, sonar, lidar, weight, RF shadow, or other spatial data sufficient to determine the relative positions and orientations of the trailer 450, boat ramp 492, shore 494 (e.g., the ground or pavement at the top of the boat ramp), and water surface 496. In some embodiments, the data from the sensors 410 may include data from one or more moisture sensors or immersion sensors, that are capable of reporting whether or not they are underwater, and/or one or more depth sensors capable of reporting a depth to which they are immersed (e.g., zero if not immersed). In some embodiments, the data from the sensors 410 may also include inclinometer or accelerometer data sufficient to compute or confirm absolute vehicle pitch 458 and/or trailer pitch 478. Trailer pitch 478 may vary significantly from vehicle pitch 458 if, for example, the trailer is on the boat ramp while at least part of the vehicle remains on the shore. In some embodiments, absolute pitch values can be used to compute relative pitch values based on the assumption that the surface of the water is horizontal and flat. Other simplifying assumptions may include assuming that the ramp is flat and has a constant, nonzero slope, and assuming that the shore is flat and has a constant, possibly nonzero slope, at least in the immediate vicinity of the boat ramp.

In some embodiments, the water level detection engine 142 constructs a 2D or 3D model that includes at least the trailer 450 and the surface of the water 496. In some embodiments, the 2D or 3D model may also include the vehicle 105, boat ramp 492, and shore 494. In some instances, a watercraft may be launched or retrieved from a beach, in which case the beach may be considered a boat ramp.

Figure 5:
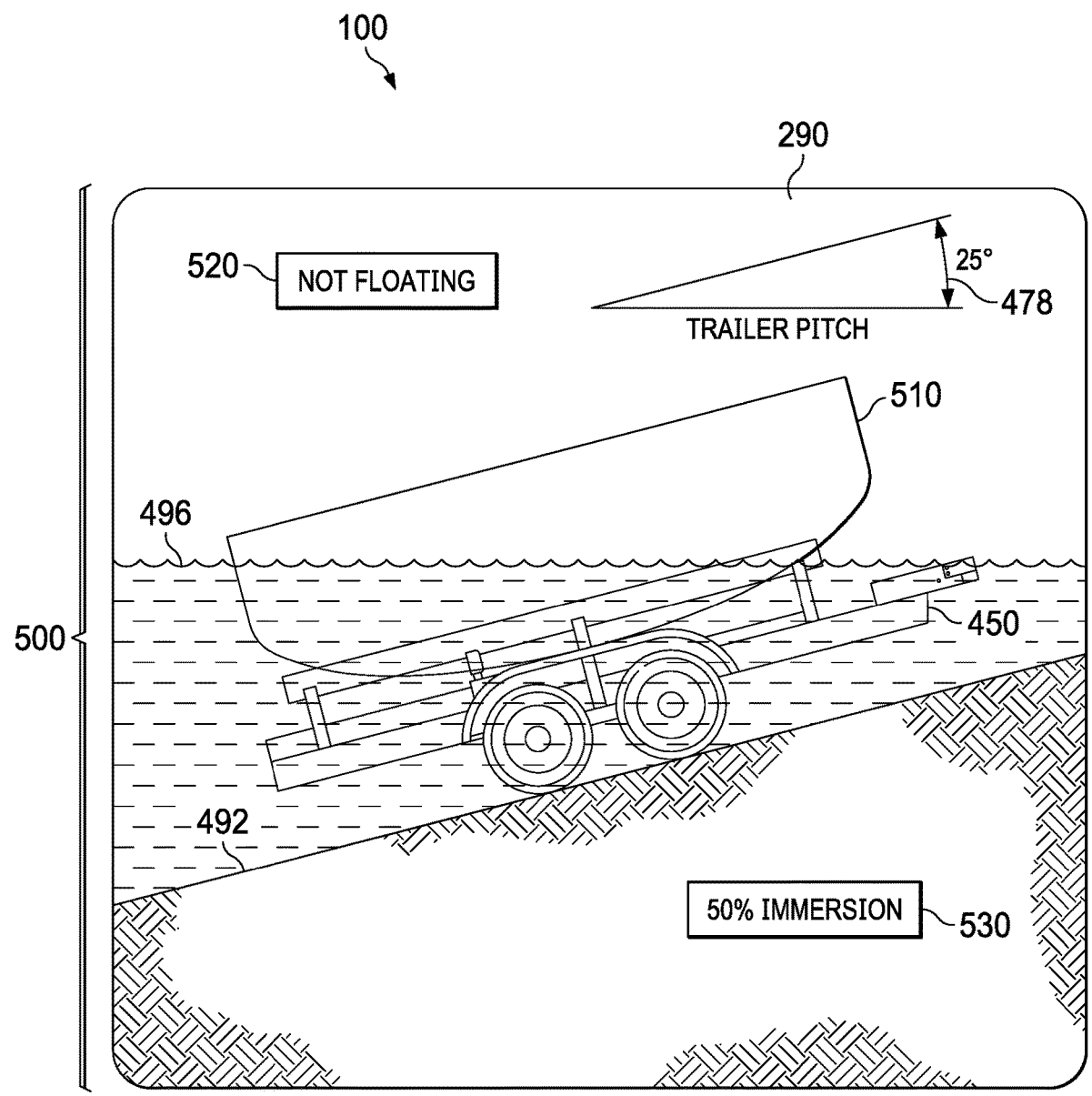
FIG. 5 is an example diagrammatic screen display of an example boat trailer water level detection system in accordance with at least one embodiment of the present disclosure.

FIG. 5 is an example diagrammatic screen display 500 of an example boat trailer water level detection system 100 in accordance with at least one embodiment of the present disclosure. In the example shown in FIG. 5, the screen display 500 is visible on a display unit 290 (e.g., the dashboard head unit) of the vehicle 105. However, in other examples it could be visible on a different display unit 290, or on the display of a portable user device 300 such as a smartphone, tablet, or laptop computer. In the example shown in FIG. 5, the screen display 500 includes representations of the boat ramp 492, the trailer 450, the water 496, and the watercraft 510. Other examples may include, instead or in addition, the vehicle 105 and/or shore 494.

In an example, the screen display 500 includes a simplified (e.g., graphical, symbolic, or diagrammatic) view of a 2D or 3D model generated in real time or near real time by the boat trailer water level detection system. The screen display 500 may comprise one or more views including the relationship between the trailer 450 and water's surface 495, including but not limited to a side view, a top view, a bottom view, a rear view (e.g., as though through a virtual rearview mirror of the vehicle 105 of seeing through the watercraft 510), a perspective view, or a forward-facing view (e.g., as though standing behind the watercraft). In some embodiments, multiple views are shown simultaneously. In other embodiments, the user may switch between different views. In still other embodiments, a default view is selected by the system and cannot be changed.

Watercraft 510 and trailer 450 may be shown photographically, graphically, symbolically, as silhouettes, or otherwise. In an example, watercraft 510 and trailer 450 may be shown with realistic shapes determined in real time or near real time by a processor (e.g., water level detection engine 142 of FIGS. 1, 2, and 4), based on information from one or more sensors (e.g., sensors 410 of FIG. 4). In other examples, watercraft 510 and trailer 450 may be shown with a generic shape representative of trailers and watercraft in general. In still other examples, watercraft 510 and trailer 450 may be sketched by the user, or selected from a menu of watercraft types (e.g., speedboat, fishing boat, pontoon boat, Jet Ski, etc.) and trailer types, which may also include a means to adjust the height and length of the representation of the watercraft 510 and/or trailer 450. In still other examples, the watercraft may not be shown in the screen display 500 at all.

In an example, a vehicle driver, viewing the screen display 500 on a vehicle head unit or other display 290, or on a portable device, is able to observe, in real time or near-real-time, the pitch 478 of the trailer 450 and the depth of the water 496 relative to the trailer 450. In an example, the position of the trailer 450 in the screen display 500 is fixed, while the trailer pitch 478 and the height or position of the water surface 496 change as the trailer 450 ascends or descends the ramp 492. In some embodiments, the screen display 500 may also include representations of the vehicle and/or the shore, such that the pitch and immersion depth of the vehicle may be seen by the driver in real time or near real time. This may be useful, for example, if it is necessary for the vehicle to leave the shore and back partly or completely onto the boat ramp.

In some embodiments, a weight sensor may indicate the weight of the watercraft on the trailer (e.g., zero if floating). In some embodiments, the system may detect and report a pitch and location of the watercraft separately from the pitch and location of the trailer, such that, for example, the watercraft is detected to be floating if its pitch or location relative to the trailer fall outside a threshold range. In some embodiments, a FLOATING/NOT FLOATING indication 520 is included on the screen display 500 to indicate whether the watercraft is detected to be floating. In some embodiments, a numerical immersion indicator 530 may provide a numerical indication (e.g., a percentage) of the immersion depth of the vehicle, trailer, or watercraft. For example, screen display 500 may include a percentage value where 0% indicates the vehicle is completely out of the water, and 100% indicates the vehicle is immersed to a degree that represents a substantial risk of mechanical damage.

Figure 6:
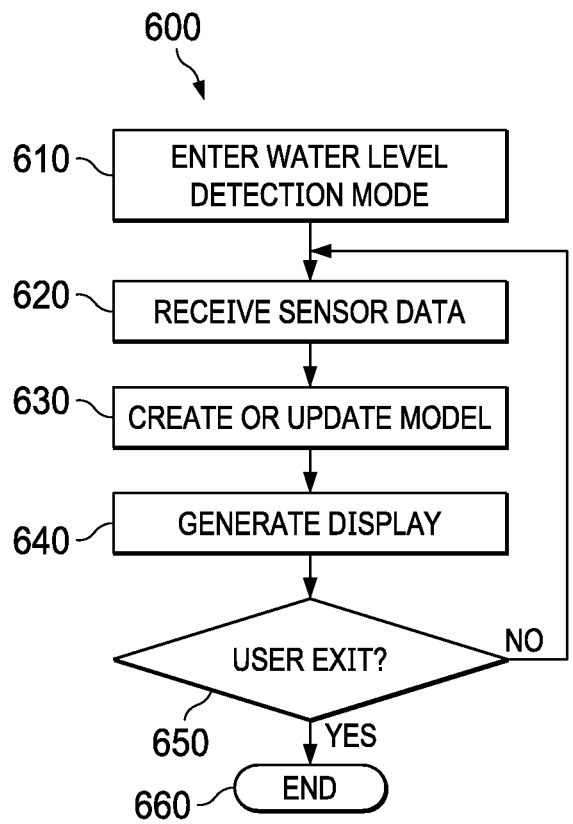
FIG. 6 is a flow diagram of an example boat trailer water level detection system control method according to at least one embodiment of the present disclosure.

FIG. 6 is a flow diagram of an example boat trailer water level detection system control method 600 according to at least one embodiment of the present disclosure. It is understood that the steps of method 600 may be performed in a different order than shown in FIG. 6, additional steps can be provided before, during, and after the steps, and/or some of the steps described can be replaced or eliminated in other embodiments. One or more of steps of the method 600 can be carried by one or more devices and/or systems described herein, such as the VCU 110 or boat trailer water level detection system control engine 142 of FIGS. 1 and 2, and/or processor circuit 750 of FIG. 7.

In step 610, the method 600 includes entering a water level detection mode based on a user input. This may occur, for example, through a menu selection, button press, voice command, or other input. In some embodiments, a control unit may activate the water level detection mode automatically, based on data received from one or more sensors.

In step 620, the method 600 includes receiving sensor data relating to the water level detection mode. The sensor data may include any of camera, radar, lidar, sonar, RF shadow, proximity, infrared, moisture, immersion, depth, weight, acceleration, or inclination data.

In step 630, the method 600 includes generating or updating a 2D or 3D model based on the sensor data received in step 620. Generating the 2D or 3D model from the sensor data may involve any of image recognition, feature recognition, shape recognition, material recognition, physics equations (e.g., dynamics or mechanics equations), pattern matching, machine learning, deep learning, or other artificial intelligence to determine at least the trailer pitch and the depth of water relative to the trailer. Other variables may additionally be determined by the model as described above.

In step 640, the method 600 includes generating a screen display to be shown to the driver of the vehicle. The screen display may for example be a screen display 500 as shown in FIG. 5, and may be shown for example on a head unit or other display screen of the vehicle, or on a portable device (e.g., display screen 290 or portable device 300 of FIGS. 2 and 3).

In step 650, the method 600 includes checking for user input received by the system. If the system has received a user input requesting to exit from water detection mode, then the method proceeds to step 660. If the system has not received a user input requesting to exit from water detection mode, then the method returns to step 620.

In step 660, the method 600 includes exiting from water level detection mode. This may involve for example removing a screen display 500 from a head unit 290, and returning the head unit 290 to an option menu from which water level detection mode had initially been requested.

Figure 7:
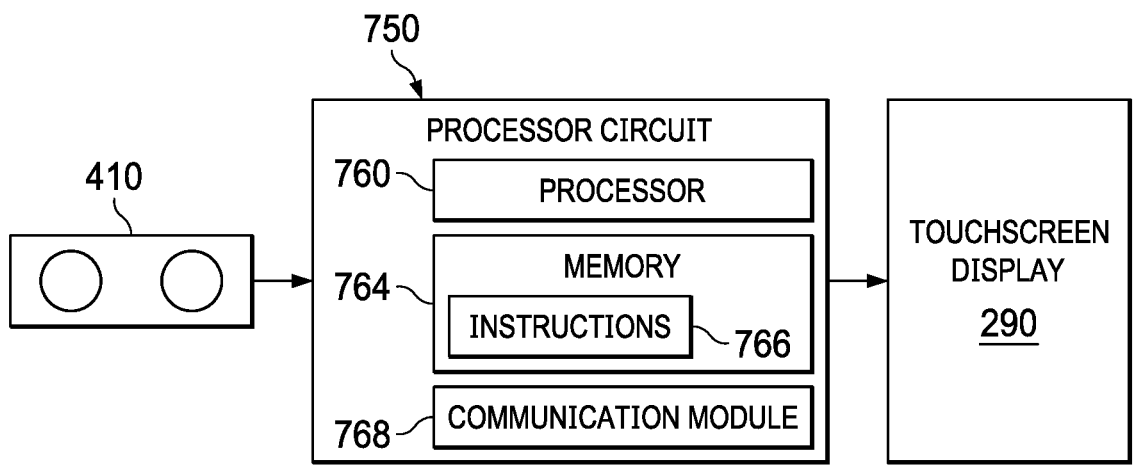
FIG. 7 is a diagrammatic illustration of a processor circuit, according to embodiments of the present disclosure.

FIG. 7 is a diagrammatic illustration of a processor circuit 750, according to embodiments of the present disclosure. The processor circuit 750 may be implemented in the boat trailer water level detection system 100, VCU 110, portable device 300, or other devices or workstations (e.g., third-party workstations, network routers, etc.), or on a cloud processor or other remote processing unit, as necessary to implement the method. As shown, the processor circuit 750 may include a processor 760, a memory 764, and a communication module 768. These elements may be in direct or indirect communication with each other, for example via one or more buses.

The processor 760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 760 may also comprise another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The memory 764 may store instructions 766. The instructions 766 may include instructions that, when executed by the processor 760, cause the processor 760 to perform the operations described herein. Instructions 766 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 768 can include any electronic circuitry and/or logic circuitry to facilitate direct or indirect communication of data between the processor circuit 750, and other processors or devices. In that regard, the communication module 868 can be an input/output (I/O) device. In some instances, the communication module 868 facilitates direct or indirect communication between various elements of the processor circuit 850 and/or the boat trailer water level detection system 100. The communication module 1068 may communicate within the processor circuit 750 through numerous methods or protocols. Serial communication protocols may include but are not limited to US SPI, I²C, RS-232, RS-485, CAN, Ethernet, ARINC 429, MOD-BUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

In the example shown in FIG. 7, the processor circuit 750 receives sensor data from a sensor 410, and sends output to a display 290.

As will be readily appreciated by those having ordinary skill in the art after becoming familiar with the teachings herein, the boat trailer water level detection system advantageously permits a driver to have situational awareness of the rising or lowering water level as a boat trailer is backed into or pulled out of a body of water. In some cases, the water level detection system may be employed by the vehicle without regard to a trailer. For example, the water level detection system may be useful when fording streams or driving on flooded roadways. Depending on the implementation, a number of variations are possible on the examples and embodiments described above. For example, different kinds of sensors may be employed, and different displays or views may be generated. The technology may be applied to different vehicle types, including on-road and off-road vehicles. Sensors and/or processors may be located on the trailer, on the watercraft, or external to the vehicle, trailer, and watercraft.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the boat trailer water level detection system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the boat trailer water level detection system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for monitoring a water level proximate to a vehicle, the system comprising:
a control unit;
at least one sensor in communication with the control unit, wherein the at least one sensor is configured such that the control unit can determine in real time:
a pitch of a trailer coupled to the vehicle; and
a height of a surface of water proximate to the trailer; and
a display screen controlled by the control unit to display a real time image simultaneously comprising:
a side-view graphical representation of the trailer including the pitch of the trailer; and
a cross-sectional graphical representation of the surface of water proximate to the trailer.

2. The system of claim 1, wherein the at least one sensor comprises at least one of a camera, radar, lidar, sonar, RF shadow, proximity, infrared, moisture, immersion, depth, weight, acceleration, or inclination sensor.

3. The system of claim 1, wherein the at least one sensor is further configured such that the control unit can determine in real time a pitch of the vehicle and a position of the vehicle relative to the trailer and the surface of water, and wherein the display screen further simultaneously displays a real-time side-view graphical representation of the vehicle including the pitch of the vehicle.

4. The system of claim 1, wherein the at least one sensor is further configured such that the control unit can determine in real time, for a watercraft on or proximate to the trailer, a location and pitch relative to the trailer and the surface of water, and wherein the display screen further simultaneously displays a real-time side-view graphical representation of the watercraft, including the location or pitch of the watercraft relative to the trailer and the surface of water.

5. The system of claim 4, wherein the control unit is further configured to display a real-time indication that the watercraft is floating if the location or pitch relative to the trailer is outside a threshold range.

6. The system of claim 1, wherein the at least one sensor comprises a weight sensor configured to measure in real time a weight of a watercraft on the trailer, and
wherein the control unit is further configured to display a real time indication that the watercraft is floating if the measured weight is less than a threshold amount.

7. The system of claim 1, wherein the display screen is a portable device or vehicle head unit.

8. The system of claim 1, further comprising the vehicle.

9. The system of claim 1, further comprising the trailer.

10. The system of claim 1, further comprising a watercraft positionable on the trailer.

11. A method comprising:
in a control unit, receiving sensor data from at least one sensor;
based on the sensor data, determining in real time a pitch of a trailer coupled to a vehicle; and
a height of a surface of water proximate to the trailer; and
displaying, on a display screen controlled by the control unit, a real time image simultaneously comprising:
a side-view graphical representation of the trailer including the pitch of the trailer; and
a cross-sectional graphical representation of the surface of water proximate to the trailer.

12. The method of claim 11, wherein the at least one sensor comprises at least one of a camera, radar, lidar, sonar, RF shadow, proximity, infrared, moisture, immersion, depth, weight, acceleration, or inclination sensor.

13. The method of claim 11, further comprising:
determining in real time a pitch of the vehicle and a height of the vehicle relative to the surface of water; and
displaying in real time a side-view graphical representation of the vehicle including the pitch of the vehicle simultaneously with the side-view graphical representation of the trailer and the cross-sectional graphical representation of the surface of water.

14. The method of claim 11, further comprising:
determining in real time, for a watercraft on or proximate to the trailer, a location and pitch relative to the trailer and the surface of water; and
displaying in real time a side-view graphical representation of the watercraft, including the location or pitch of the watercraft relative to the trailer and the surface of water simultaneously with the side-view graphical representation of the trailer and the cross-sectional graphical representation of the surface of water.

15. The method of claim 14, further comprising displaying a real-time indication that the watercraft is floating if the location or pitch relative to the trailer is outside a threshold range.

16. The method of claim 11, wherein the at least one sensor comprises a weight sensor configured to measure a weight of a watercraft on the trailer, and wherein the method further comprises displaying an indication that the watercraft is floating if the measured weight is less than a threshold amount.

17. The method of claim 11, wherein the display screen is a portable device or vehicle head unit.

18. The method of claim 11, wherein the control unit is associated with the vehicle, the trailer, or a watercraft positionable on the trailer.

19. A system for monitoring water level proximate to a vehicle, the system comprising:
   a control unit;
      at least one sensor in communication with the control unit, wherein the at least one sensor is configured such that the control unit can determine in real time a depth of the vehicle within a body of water and a pitch of a trailer towed by the vehicle; and
      a display screen disposed within a dashboard of the vehicle and controlled by the control unit to display a real time image comprising a side-view graphical representation of the depth of the vehicle in the body of water and the pitch of the trailer towed by the vehicle.

20. The system of claim 19, further comprising an audible tone controlled by the control unit, wherein the audible tone is indicative of the depth of the vehicle in the body of water.

* * * * *